United States Patent [19]

Dieck et al.

[11] 4,107,108

[45] Aug. 15, 1978

[54] POLYPHOSPHAZENE PLASTICIZED RESINS

[75] Inventors: Ronald L. Dieck; Edwin J. Quinn, both of Lancaster, Pa.

[73] Assignee: Armstrong Cork Company, Lancaster, Pa.

[21] Appl. No.: 766,780

[22] Filed: Feb. 8, 1977

[51] Int. Cl.² ............................................. C08J 9/10
[52] U.S. Cl. ................................. 521/85; 260/30.6 R; 260/DIG. 2.4; 521/189; 521/50; 521/180; 521/95
[58] Field of Search ...................... 260/30.6 R, 2.5 R

[56] References Cited

U.S. PATENT DOCUMENTS

| | | | |
|---|---|---|---|
| 3,856,713 | 12/1974 | Rose et al. | 260/2 P |
| 3,867,344 | 2/1975 | Frank et al. | 260/2 P |
| 3,883,451 | 5/1975 | Reynard et al. | 260/2 P |
| 3,943,088 | 3/1976 | Kyker | 260/2 P |

*Primary Examiner*—Morton Foelak
*Attorney, Agent, or Firm*—Richard J. Hammond

[57] ABSTRACT

Flame-retardant and low-smoke plasticized polyphosphazenes are disclosed. The plasticizers are substituted cyclotriphosphazenes and cyclotetraphosphazenes.

5 Claims, No Drawings

POLYPHOSPHAZENE PLASTICIZED RESINS

BACKGROUND OF THE INVENTION

1. Field of the Invention

This invention relates to plasticized compositions of polyphosphazene homopolymers and copolymers, to flexible and semi-rigid films and foams produced from said plasticized compositions, and to a process for preparing said plasticized compositions, films and foams. The plasticized compositions of this invention exhibit excellent flame-retardant and film-forming properties. Films and foams prepared from the plasticized polyphosphazenes exhibit excellent flame-retardant properties and produce low smoke levels or essentially no smoke when heated in a flaming or nonflaming mode.

2. Description of the Prior Art

The preparation of polyphosphazene polymers has been disclosed in U.S. Pat. No. 3,370,020. Allcock; U.S. Pat. No. 3,856,712, Reynard et al; U.S. Pat. No. 3,856,713, Rose et al; and U.S. Pat. No. 3,883,451, Reynard et al. Recently, the blending of phosphazene-epoxy prepolymers with organic liquid prepolymers, such as phenolics, epoxides, polyurethanes and polyesters, and subsequently curing such blends, has been disclosed in U.S. Pat. No. 3,867,334, Frank et al. Poly(-fluoroalkoxyphosphazene) vulcanizates have similarly been blended or plasticized with low molecular weight fluoroalkoxide oils, as disclosed in U.S. Pat. No. 3,943,088, Kyker et al. However, the products produced by the methods of the prior art have widely varying processing and physical characteristics which, in many cases, limit their utility, particularly when it is desired to prepare films or foams.

In our U.S. Pat. application Ser. No. 705,116, filed July 12, 1976, improved phosphazene polymers have been disclosed comprising a blend of a polyphosphazene having a Young's modulus of up to about $5 \times 10^8$ dynes/cm$^2$ and at least one polyphosphazene having a Young's modulus of at least $5 \times 10^8$ dynes/cm$^2$. These blends form excellent sheets, films and foams.

SUMMARY OF THE INVENTION

We have now found that products, particularly films and foams having tailored, highly desirable physical characteristics, may be prepared by blending phosphazene homopolymers or copolymers with compatible fully substituted or partially substituted cyclophosphazene plasticizers. That is to say, we have discovered that films and foams having a predetermined degree of flexibility and exhibiting excellent flame-retardant and smoke properties may be prepared by plasticizing a phosphazene homopolymer or copolymer with a compound of the formula $$(NPR_{2x-y}R_{1y})_x$$

wherein R and R$_1$ can be the same or different and are halogen, amino, C$_1$ to C$_{10}$ dialkylamino, C$_1$ to C$_{10}$ alkylamino, C$_6$ to C$_{14}$ arylamino, C$_6$ to C$_{14}$ diarylamino, C$_1$ to C$_{18}$ linear or branched alkyl, C$_2$ to C$_{18}$ linear or branched alkenyl, C$_1$ to C$_{18}$ alkoxy, C$_6$ to C$_{14}$ aryl, C$_6$ to C$_{14}$ aryloxy, substituted C$_1$ to C$_{18}$ linear or branched alkyl, substituted C$_2$ to C$_{18}$ linear or branched alkenyl, substituted C$_1$ to C$_{18}$ alkoxy, substituted C$_6$ to C$_{14}$ aryl, substituted C$_6$ to C$_{14}$ aryloxy, the substituents being selected from the group consisting of halogen, nitro, cyano, alkoxy, aryloxy, amino, C$_1$ to C$_{10}$ alkylamino, C$_1$ to C$_{10}$ dialkylamino, C$_6$ to C$_{14}$ arylamino, or C$_6$ to C$_{14}$ diarylamino,
where x is at least 3 and can be as great as 9, and $y \leq 2x$. For simplicity throughout the specification, these compounds will hereinafter be referred to as cyclophosphazene plasticizers, or simply plasticizers. The amount of such plasticizers useful in the compositions in accordance with the present invention may vary from about 0.1 to about 100, preferably 1 to about 50, most preferably 5 to 30 by weight based on 100 parts of polymeric phosphazene.

The aryloxide or alkoxide cyclophosphazene plasticizers of use in accordance with the present invention can be prepared, for example, by following the general reaction scheme taught by Dieck et al, "The Preparation and Characterization of the Compounds N$_3$P$_3$(OC$_6$H$_4$-p-F)$_6$, N$_3$P$_3$(OC$_6$H$_4$-PCl)$_6$, and N$_3$P$_3$(OC$_6$H$_4$-PBr)$_6$", Inorg. Nucl. Chem. Letters, 11, 313 (1975).

Generally, the procedure for the preparation of fully and partially substituted cyclophosphazene oxide plasticizers comprises forming the alkali metal salt of the desired alkoxide or aryloxide compounds, e.g. HOR or HOR', where R and R' are defined as above, in a suitable solvent such as tetrahydrofuran or dioxane. The oxide salts are then slowly added to the cyclic starting material such as trimer or tetramer, hexachlorocyclotriphosphazene, or octachlorocyclotetraphosphazene, (NPCl$_2$)$_x$ where X = 3 or 4, in a suitable solvent, as above. The reaction is conducted at low temperatures in order to retard side reactions. The use of significant amounts of solvent also promotes a uniform product. The product is then isolated. In a preferred isolation technique, a water immiscible solvent is substituted for the reaction solvent, and the solution is washed seriatim with dilute acid, dilute base, and water in order to remove unreacted starting materials and byproducts. The organic layer is then vacuum distilled to yield the desired cyclophosphazene plasticizers.

The procedure of preference for the preparation of fully or partially substituted cyclophosphazene alkyl or aryl plasticizers in accordance with the present invention is that of the general reaction scheme taught by Moeller et al, Chem. Ind. (London) p. 361 (1962).

Generally, the procedure for the preparation of aliphatic or aromatic-substituted cyclophosphazene plasticizers comprises the interaction of an organometallic compound with the cyclic halophosphazene (NPCl$_2$)$_x$ where x = 3 or 4. In a typical reaction, an organolithium reagent is allowed to react with a boiling diethyl ether solution of (NPF$_2$)$_3$ in an atmosphere of dry nitrogen for several hours. The ether is removed by distillation and the residue vacuum distilled to give the cyclic phosphazene fully or partially substituted with alkyl or aryl groups.

A further embodiment of the phosphazene plasticizers in accordance with the present invention are those cyclophosphazene plasticizers bearing amine substituents. These amine-substituted materials are best prepared by the aminolysis reaction as set forth in Allcock, Phosphorus-Nitrogen Compounds, Academic Press, N.Y. 1972, page 176 ff.

Generally, for amino or alkylamino substituents, (NPCl$_2$)$_3$ is dissolved in anhydrous diethyl ether and excess alkylamine (or ammonia) added at dry-ice temperatures, e.g. −78° C. After removal of the amine hydrochloride salt, the solvent is evaporated and crude amine-substituted cyclic phosphazene remains. Recrystallization gives the desired product in acceptable purity. Aromatic amine substituents are best prepared by a solventless reaction of trimer (NPCl$_2$)$_3$ with, for example, aniline at 100° C. Upon cooling, the mixture crystallizes and the substituted product can be obtained in good yields by suitable washings and recrystallization.

It should be noted, however, that the starting material referred to above, the halogenated cyclic trimer or tetramer, (NPCl$_2$)$_x$ where $x = 3$ or 4, is itself a plasticizer and its further reaction to form other plasticizers is not necessary to effect an efficient plasticizing material.

The cyclic plasticizers set forth above have been found to be useful as plasticizers in a variety of prior art phosphazene polymers. These phosphazene polymers are represented by the repeating units of the following formula:

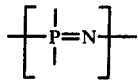

in which various groups are attached to the phosphorous atom through carbon, oxygen, nitrogen, and the like; such groups including alkoxy, aryloxy, alkyl, aryl, amino, alkylamino, arylamino, etc. See Allcock, Phosphorous-Nitrogen Compounds, Academic Press, N.Y. 1972. The phosphazene polymers described in the prior art are of the structure

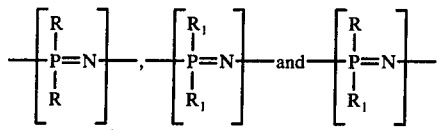

where R and R$_1$ can be the same or different and are as identified above. In the case of copolymers, these groups are generally of a non-regular order, although those stereoregular polymers such as described in our copending Application Ser. No. 669,100 filed Mar. 22, 1976, incorporated herein by reference, are also plasticized according to the present invention. Illustrative of the preferred prior art polymeric phosphazenes of use herein are those homopolymers of aryloxy and alkoxy phosphazenes as set forth in U.S. Pat. No. 3,370,020 or U.S. Pat. No. 3,853,794; as well as those copolymers of aryloxy and alkoxyphosphazenes as set forth in U.S. Pat. Nos. 3,856,712; 3,856,713; 3,883,451; and 3,948,820, incorporated herein by reference.

The most preferred polyphosphazene polymers used in the preparation of the plasticized blends of this invention comprise randomly repeating aryloxy units represented by the formulas

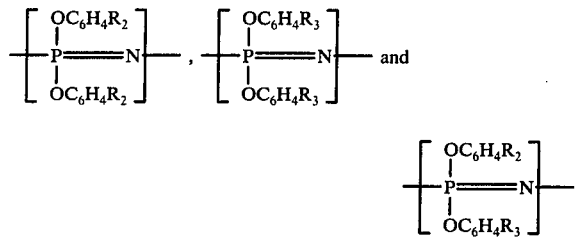

wherein R$_2$ and R$_3$ are the same or different and are C$_1$ to C$_{10}$ linear or branched alkyl, substituted C$_1$ to C$_{10}$ linear or branched alkyl, C$_1$ to C$_{10}$ alkoxy, substituted alkoxy, arylalkyl, C$_6$ to C$_{14}$ aryl or substituted C$_6$ to C$_{14}$ aryl. The substituents R$_2$ and R$_3$ are illustrated by the groups ethyl, propyl, isopropyl, butyl, isobutyl, amyl, isoamyl, hexyl, octyl, decyl, and the like. Other examples of R$_2$ and R$_3$ include ethoxy, methoxy, isopropoxy, N-butoxy, methyl, tertiary butyl, tertiary pentyl, 2-ethylhexyl, n-nonyl, dimethylamino, chloro, bromo, fluoro, naphthyl and cresyl. Where R$_2$ and R$_3$ are substituted C$_1$ to C$_{10}$ linear or branched alkyl or C$_1$ to C$_{10}$ linear and branched alkoxy, the substituents are illustrated by chloro, bromo, cyano, nitro, methoxy, ethoxy, propoxy, amino, dimethylamino, methylamino, and the like.

It is to be understood that when R$_2$ is the same as R$_3$, homopolymers are formed. When R$_2$ and R$_3$ are substituted phenyl, it is presently preferred that all R$_2$'s are the same as all R$_3$'s. However, in substituted phenyl, the R$_2$'s can be mixed and the R$_3$'s can be mixed. The mixtures may be mixtures of different alkyl radicals or mixtures of different ortho, meta and para isomers. One skilled in the art readily will recognize that steric hindrance will dictate the propriety of using relatively bulky groups in the para position on the aryloxy ring since, as set forth hereinafter, the polymers are made by reacting a substituted metal oxide with the chlorine atom on the phosphorus atom of polydichlorophosphazene. Desirably, groups which sterically inhibit this reaction should be avoided. Absent the foregoing proviso, selection of various R$_2$'s and R$_3$'s, in the case of phenyl substituents, will be apparent to anyone skilled in the art based upon this disclosure.

For the sake of simplicity, the most preferred polymers used to prepare the plasticized blends in accordance with the present invention, containing the repeating units disclosed above, may be represented by the formula [NP(OC$_6$H$_4$R$_2$)$_a$(OC$_6$H$_4$R$_3$)$_b$]$_n$ wherein n is from about 20 to about 2,000 or more, and wherein a and b are greater than O, and $a + b = 2$. It should be understood that, in the case of homopolymers, R$_2$ = R$_3$ and $a = b = 2$.

The polymers used to prepare the plasticized compositions of this invention may contain small amounts of randomly distributed repeating units in addition to the repeating units described above. Examples of these additional repeating units are:

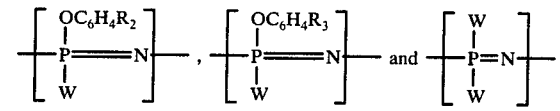

wherein W represents a group capable of a crosslinking chemical reaction, such as aliphatic unsaturation on an aromatic ring or olefinic unsaturation, preferably ethylines unsaturation. Such group is capable of further reaction at relatively moderate temperatures. In copolymers containing W, the ratio of W: [(OC$_6$H$_4$R$_2$) + (OC$_6$H$_4$R$_3$)] is less than about 1:5. For the sake of simplicity, the copolymers which are further reactive may be represented by the formula [NP(OC$_6$H$_4$R$_2$)$_a$(OC$_6$H$_4$R$_3$)$_b$(W)$_c$]$_n$, wherein W, R$_2$, R$_3$, n, a, and b are as set forth above and wherein $a + b + c = 2$. Examples of W are —C$_6$H$_4$Ch$_2$CH=CH$_2$, C$_6$H$_3$—2—OCH$_3$-4-CH$_2$CH=CH$_2$, CH$_2$CH=CH$_2$; OR$_2$CH$_2$CH=CH$_2$; OC(R$_4$)=CH$_2$; OR$_3$CF=CF$_2$, and similar groups which contain unsaturation, wherein R$_2$ is defined above and R$_4$ is any aliphatic or aromatic radical, especially —CH$_2$—. These groups are capable of further reaction at moderate temperatures (for example, 250°–350° F.) by free radical processes utilizing various free radical sources. Conventional sulfur curing or vulcanizing additives known in the rubber art or other reagents, often even in the absence of accelerators, using conventional amounts, techniques, and processing equipment are also useful in achieving further reaction in copolymers containing the group W.

The above-described phosphazene polymers, preferred phosphazene polymers and most preferred phosphazene polymers, including those containing reactive sites designated as W below, may be crosslinked and/or cured at moderate temperatures (for example 200°–350° F.) by the use of free radical initiators, for example peroxides, using conventional amounts, techniques and processing equipment.

Examples of free radical initiators include benzoyl peroxide, bis(2,4-dichlorobenzoyl peroxide), di-tert-butyl peroxide, dicumyl peroxide, 2,5-dimethyl(2,5-di-tert-butylperoxy) hexane, t-butyl perbenzoate, 2,5-dimethyl-2,5-di(tert-butyl peroxy) hepyne-3, and 1,1-bis(tert-butylperoxy)-3,3,5-trimethylcyclohexane.

Thus, the general peroxide classes which may be used for crosslinking include diacyl peroxides, peroxyesters, and dialkyl peroxides.

Examples of sulfur-type curing systems include vulcanizing agents such as sulfur, sulfur monochloride, selenium, tellurium, thiuram disulfides, p-quinone dioximes, polysulfide polymers, and alkyl phenol sulfides. The above vulcanizing gents may be used in conjunction with accelerators, such as aldehyde amines, thio carbamates, thiuram sulfides, quanidines, and thiazols, and accelerator activators, such as zinc oxide or fatty acids, e.g., stearic acid.

It is also possible to use as W in the above formulas, monovalent radicals represented by the formulas (1) $-OSi(OR^5)_2R^6$ and other similar radicals which contain one or more reactive groups attached to silicon; (2) $-OR^7NR^7H$ and other radicals which contain reactive -NH linkages. In these radicals $R^5$, $R^6$ and $R^7$ each represent aliphatic, aromatic and acyl radicals. Like the groups above, these groups are capable of further reaction at moderate temperatures in the presence of compounds which effect crosslinking. The presence of a catalyst to achieve a cure is often desirable. The introduction of groups such as W into polyphosphazene polymers is shown in U.S. Pat. No. 3,888,799; 3,702,833 and 3,844,983, which are hereby incorporated by reference.

In the case of most preferred copolymers herein, it is contemplated that the plasticized blends of this invention contain a mole ratio of a:b of at least about 1:6 and up to 6:1, and preferably between about 1:4 and 4:1. It is also contemplted that the mole ratio of c:(a+b) will be less than about 1:5, preferably from about 1:50 to about 1:10.

The phosphazene polymers preferably used in the plasticized blends of this invention may be prepared in accordance with the process described in U.S. Pat. No. 3,570,020 or our copending application Ser. No . 661,862, filed Feb. 27, 1976, which description is incorporated herein by reference. Accordingly, the polymers which may be used to prepare the blends of this invention may be prepared by a multistep process wherein the first step comprises thermally polymerizing a compound having the formula (NPCl$_2$)$_3$ by heating it at a temperature and for a length of time ranging from about 200° C. for 48 hours to 300° C. for 30 minutes, preferably in the absence of oxygen, and most preferably in the presence of a vacuum of at least $10^{-1}$ Torr. That is to say, the compounds are heated to a temperature ranging from about 200° to about 300° C. for from about 30 minutes to 48 hours, the higher temperatures necessitating shorter contact times. The compounds must be heated for such a length of time that only a minor amount of unreacted charge material remains and a major amount of high polymer has been produced. Such a result is generally achieved by following the conditions of temperature and contact time specified above.

It is preferred that the thermal polymerization be carried out in the pesence of an inert gas such as nitrogen, neon, argon or a vacuum, e.g., less than about $10^{-1}$ Torr inasmuch as the reaction proceeds very slowly in the presence of air. The use of such gas, however, is not critical.

The polymers resulting from the thermal polymerization portion of the process are in the form of a polymeric mixture of different polymers of different chain lengths. That is to say, the product of the thermal polymerization is a mixture of polymers having the formula $+NPCl_2)_n$ wherein n ranges from about 20 to about 2,000. For example, the recovered media may contain minor amounts of a polymer where n is 20 and major amounts of polymer where n is 2,000. The media may also contain polymers composed of from 21–1,999 recurring units and some unreacted trimer. The complete mixture of polymers and unreacted trimer constitutes the charge to the second step of the process.

In those preferable prior art phosphazene polymers to be plasticized in accordance with the present invention, both aryloxy and alkoxy homopolymers or copolymers can be prepared. When homopolymers are to be prepared, the second or esterification step of the process comprises treating the mixture resulting from the thermal polymerization step with a compound having the formula M(OR)$_x$ or M(OC$_6$H$_4$R$_2$)$_x$ wherein M is lithium, sodium, potassium, magnesium or calcium, x is equal to the valence of metal M, R and $R_2$ is as specified above.

Similarly, when copolymers are to be prepared, the second or esterification step comprises treating the mixture resulting from the thermal polymerization step with a mixture of compounds having the formulas M(OR)$_x$, M(OR$_1$)$_x$, M(OC$_6$H$_4$R$_2$)$_x$, M(OC$_6$H$_4$R$_3$)$_x$, and, if desired,
M(W)$_x$ wherein M, x, R, $R_1$, $R_2$, $R_3$ and W are as specified above.

With respect to the polymerization step mentioned above, the polymer mixture is reacted with the alkali or alkaline earth metal compounds at a temperature ranging from about 25° to about 200° C. for from about 3 hours to 7 days, the lower temperatures necessitating the longer reaction times and the higher temperatures allowing shorter reaction times. These conditions are, of course, utilized in order to obtain the most complete reaction possible, i.e., in order to insure the complete conversion of the chlorine atoms in the polymer mixtures to the corresponding ester of the alkali or alkaline earth starting materials.

The above esterification step is carried out in the presence of a solvent. The solvent employed in the esterification step must have a relatively high boiling point (e.g., about 115° C., or higher) and should be a solvent for both the polymer and the alkali or alkaline earth metal compounds. In addition, the solvent must be substantially anhydrous, i.e., there must be no more water in the solvent or metal compounds than will result in more than 1%, by weight, of water in the reaction mixture. The prevention of water in the system is necessary in order to inhibit the reaction of the available chlorine atoms in the polymer therewith. Examples of suitable solvents include diglyme, triglyme, tetraglyme, toluene and xylene. The amount of solvent employed is not critical and any amount sufficient to solubilize the chloride polymer mixture can be employed. Either the polymer mixture or the alkaline earth (or alkali) metal compounds may be used as a solvent solution thereof in an inert, organic solvent. It is preferred, however, that at least one of the charge materials be used as a solution in a compound which is a solvent for the polymeric mixture.

The amount of the alkali metal or alkaline earth metal compound employed or the combined amount of the mixture of said compounds employed when copolymers are being prepared should be at least molecularly equivalent to the number of available chlorine atoms in the polymer mixture. However, it is preferred that an excess of the metal compounds be employed in order to assure complete reaction of all the available chlorine atoms. Generally, the ratio of the individual alkali metal or alkaline earth metal compounds in the combined mixture governs the ratio of the groups attached to the polymer backbone. However, those skilled in the art readily will appreciate that the nature and, more particularly, the steric configuration of the metal compounds employed may effect their relative reactivity. Accordingly, when preparing copolymers, the ratio of $R_2$'s and $R_3$'s in the esterified product, if necessary, may be controlled by employing a stoichiometric excess of the slower reacting metal compound.

Examples of alkali or alkaline earth metal compounds which are useful in the process of the present invention include:
  sodium phenoxide
  potassium phenoxide
  sodium p-methoxyphenoxide
  sodium o-methoxyphenoxide
  sodium m-methoxyphenoxide
  lithium p-methoxyphenoxide
  lithium o-methoxyphenoxide
  lithium m-methoxyphenoxide
  potassium p-methoxyphenoxide
  potassium o-methoxyphenoxide
  potassium m-methoxyphenoxide
  magnesium p-methoxyphenoxide
  magnesium m-methoxyphenoxide
  magnesium o-methoxyphenoxide
  calcium p-methoxyphenoxide
  calcium o-methoxyphenoxide
  calcium m-methoxyphenoxide
  sodium p-ethoxyphenoxide
  sodium o-ethoxyphenoxide
  sodium m-ethoxyphenoxide
  potassium p-ethoxyphenoxide
  potassium o-ethoxyphenoxide
  potassium m-ethoxyphenoxide
  sodium p-n-butoxyphenoxide
  sodium m-n-butoxyphenoxide
  lithium p-n-butoxyphenoxide
  lithium m-n-butoxyphenoxide
  potassium p-n-butoxyphenoxide
  potassium m-n-butoxyphenoxide
  magnesium p-n-butoxyphenoxide
  magnesium m-n-butoxyphenoxide
  calcium p-n-butoxyphenoxide
  calcium m-n-butoxyphenoxide
  sodium p-n-propoxyphenoxide
  sodium o-n-propoxyphenoxide
  sodium m-n-propoxyphenoxide
  potassium p-n-propoxyphenoxide
  potassium o-n-propoxyphenoxide
  potassium m-n-propoxyphenoxide
  sodium p-methylphenoxide
  sodium o-methylphenoxide
  sodium m-methylphenoxide
  lithium p-methylphenoxide
  lithium o-methylphenoxide
  lithium m-methylphenoxide
  sodium p-ethylphenoxide
  sodium o-ethylphenoxide
  sodium m-ethylphenoxide
  potassium p-n-propylphenoxide
  potassium o-n-propylphenoxide
  potassium m-n-propylphenoxide
  magnesium p-n-propylphenoxide
  sodium p-isopropylphenoxide
  sodium o-isopropylphenoxide
  sodium m-isopropylphenoxide
  calcium p-isopropylphenoxide
  calcium o-isopropylphenoxide
  calcium m-isopropylphenoxide
  sodium p-sec butylphenoxide
  sodium m-sec butylphenoxide
  lithium p-sec butylphenoxide
  lithium m-sec butylphenoxide
  lithium p-tert. butylphenoxide
  lithium m-tert. butylphenoxide
  potassium p-tert. butylphenoxide
  potassium m-tert. butylphenoxide
  sodium p-tert. butylphenoxide
  sodium m-tert. butylphenoxide
  sodium propeneoxide
  sodium p-nonylphenoxide
  sodium m-nonylphenoxide
  sodium o-nonylphenoxide
  sodium 2-methyl-2-propeneoxide
  sodium 2-methoxy-4-allylphenoxide
  potassium buteneoxide
  potassium o-allylphenoxide
and the like.

The second step of the process results in the production of a homopolymer mixture having the formula $$[NP(OR)_2]_n \text{ or } [NP(OC_6H_4R_2)_2]_n$$

or a copolymer mixture having the formula

{NP(OR$_2$)$_a$(OR$_3$)$_b$(W)$_c$}$_n$ or
{NP(OC$_6$H$_4$R$_2$)$_a$(OC$_6$H$_4$R$_3$)$_b$(W)$_c$}$_n$ wherein $n$, R$_2$, R$_3$ and W are as specified above, where $b$, but not $c$ and $a$, can be zero, and where $a + b + c = 2$, and the corresponding metal chloride salt.

The polymeric reaction mixture resulting from the second or esterification step is then treated to remove the salt which results upon reaction of the chlorine atoms of the polymer mixture with the metal of the alkali or alkaline earth metal compounds. The salt can be removed by merely precipitating it out and filtering, or it may be removed by any other applicable method, such as by washing the reaction mixture with water after neutralization thereof with, for example, an acid such as hydrochloric acid.

The next step in the process comprises fractionally precipitating the polymeric material to separate out the high polymer from the low polymer and any unreacted trimer. The fractional precipitation is achieved by the, preferably dropwise, addition of the esterified polymer mixture to a material which is a non-solvent for the high polymer and a solvent for the low polymer and unreacted trimer. That is to say, any material which is a non-solvent for the polymers wherein $n$ is higher than 350 and a solvent for the remaining low polymers may be used to fractionally precipitate the desired polymers. Examples of materials which can be used for this purpose include hexane, diethyl ether, carbon tetrachloride, chloroform, dioxane, methanol, water and the like. The fractional precipitation of the esterified polymeric mixture generally should be carried out at least twice and preferably at least four times in order to remove as much of the low polymer from the polymer mixture as possible. The precipitation may be conducted at any temperature, however, it is preferred that room temperature be employed. The high molecular weight polymer mixture may then be recovered by filtration, centrifugation, decantation or the like.

The homopolymers and copolymers prepared in accordance with the above-described process are thermally stable. They are soluble in specific organic solvents such as tetrahydrofuran, benzene, xylene, toluene, dimethylformamide and the like, and can be formed into films from solutions of the polymers by evaporation of the solvent. The polymers are water resistant at room temperature and do not undergo hydrolysis. However, the elasticity of the various polymers varies greatly, such that many of the polymers cannot be worked into useful forms. This undesirable characteristic can be overcome by plasticizing at least one of the above polymers with the cyclophosphazene materials as disclosed earlier at a blend ratio of from about 1:3 to 3:1. The resulting blends are characterized by a Young's modulus between about $1 \times 10^6$ to about $1 \times 10^{11}$, most preferably about $3.0 \times 10^7$ to about $2.50 \times 10^9$ dynes/cm$^2$. The blends may be used to prepare films, fibers, coatings, molding compositions and the like. Additionally, the blends may be used to prepare foamed products which exhibit excellent fire retardance and which produce low smoke levels, or essentially no smoke when heated in an open flame. The foamed products may be prepared from filled or unfilled formulations using conventional foam techniques with chemical blowing agents, i.e. chemical compounds stable at original room temperature which decompose or interact at elevated temperatures to provide a cellular foam. Suitable chemical blowing agents include:

| Blowing Agent | Effective Temp. Range ° C. |
|---|---|
| Azobisisobutyronitrile | 105–120 |
| Azo dicarbonamide (1,1-azobisformamide) | 100–200 |
| Benzenesulfonyl hydrazide | 95–100 |
| N,N'-dinitroso-N,N'-dimethyl terephthalamide | 65–130 |
| Dinitrosopentamethylenetetramine | 130–150 |
| Ammonium carbonate | 58 |
| p,p'-oxybis-(benzenesulfonylhydrazide) | 100–200 |
| Diazo aminobenzene | 84 |
| Urea-biuret mixture | 90–140 |
| 2,2'-azo-isobutyronitrile | 90–140 |
| Azo hexahydrobenzonitrile | 90–140 |
| Diisobutylene | 103 |
| 4,4'-diphenyl disulfonylazide | 110–130 |

Typical peroxide curable foam formulations include:

| | |
|---|---|
| Phosphazene polymer | 100 parts |
| Filler (e.g., alumina trihydrate) | 0–100 phr |
| Stabilizer (e.g., Magnesium oxide) | 2.5–10 phr |
| Processing aid (e.g., zinc stearate) | 2.5–10 phr |
| Plasticizer resin (e.g., Cumar P-10, coumarone indene resin) | 0–50 phr |
| Blowing agent (e.g., 1,1'-azobisformamide) | 10–50 phr |
| Activator (e.g., oil-treated urea) | 10–40 phr |
| Peroxide curing agent (e.g., 2,5-dimethyl-2,5-di(t-butylperoxy)hexane) | 2.5–10 phr |
| Peroxide curing agent (e.g., benzoyl peroxide) | 2.5–10 phr |
| Cyclophosphazene plasticizer | 0.1–100 phr |

Typical sulfur curable formulations include:

| | |
|---|---|
| Phosphazene polymer | 100 parts |
| Filler (e.g., alumina trihydrate) | 0–250 phr |
| Stabilizer (e.g., magnesium oxide) | 0–10 phr |
| Processing aid (e.g., zinc stearate) | 2–20 phr |
| Blowing agent (e.g., 1,1'-azobisformamide) | 10–50 phr |
| (e.g. (e.g., oil-treated urea) | 2–20 phr |
| Vulcanizer (sulfur) | 0.5–5 phr |
| Pigment (TiO$_2$) | 0–10 phr |
| Accelerators | |
| (e.g., zinc dimethyldithiocarbamate) | 0.4–5 phr |
| (e.g. tellurium diethyldithiocarbamate) | 0.2–2 phr |
| (e.g. N,N'-dibutylthiourea) | 0.2–2 phr |
| Cyclophosphazene plasticizer | 0.1–100 phr |

While the above are preferred formulation guidelines, obviously some or all of the adjuvants may be omitted, replaced by other functionally equivalent materials, or the proportions varied, within the skill of the art of the foam formulator.

In one suitable process, the foamable ingredients are blended together to form a homogeneous mass; for example, a homogeneous film or sheet can be formed on a 2-roller mill, preferably with one roll at ambient temperature and the other at moderately elevated temperature, for example 120°–140° F. The homogeneous foamable mass can then be heated, to provide a foamed structure; for example, by using a mixture of a curing agent having a relatively low initiating temperature, such as benzoyl peroxide, and a curing agent having a relatively high initiating temperature, such as 2,5-dimethyl-2,5-di(t-butylperoxy) hexane, and partially precuring in a closed mold for about 6–30 minutes at 200°–250° F., followed by free expansion for 30–60 minutes at 300°–350° F. In the alternative, the foaming may be accomplished by heating the foamable mass for 30–60 minutes at 300°–350° F. using a high temperature or low temperature curing agent, either singly or in combination. One benefit of utilizing the "partial precure" foaming technique is that an increase in the molecular weight of the foamable polymer prior to the foaming step enables better control of pore size and pore uniformity in the foaming step. The extent of "precure" desired is dependent upon the utlimate foam characteristics desired. The desired foaming temperature is dependent on the nature of the blowing agent and the crosslinkers present. The time of heating is dependent on the size and shape of the mass being foamed. The resultant foams are generally light tan to yellowish in appearance, and vary from flexible to semirigid, depending upon the relative amounts and the Young's modulus of the elastomeric and nonelastomeric polymers employed in the foam formulation. As indicated, inert, reinforcing or other fillers such as alumina trihydrate, hydrated silicas or calcium carbonate can be added to the foams and the presence of these and other conventional additives should in no way be construed as falling outside the scope of this invention.

Also, as mentioned above, the plasticized compositions of this invention can be crosslinked at moderate temperatures by conventional free radical and/or sulfur curing techniques when minor amounts of unsaturated groups W are present in the copolymer backbone. The ability of these compositions to be cured at temperatures below about 350° F. makes them particularly useful as potting and encapsulation compounds, sealants, coatings and the like. These platicized materials are also useful for preparing crosslinked foams which exhibit significantly increased tensile strengths over uncured foams. These compositions are often crosslinked in the presence of inert, reinforcing or other fillers and the presence of these and other conventional additives are deemed to be within the scope of this invention.

The following examples are set forth for purposes of illustration only and are not to be construed as limitations of the present invention except as set forth in the appended claims. All parts and percentages are by weight unless otherwise indicated.

Example 1

$N_3P_3(OC_6H_5)_6$

An anhydrous dioxane solution containing 0.34 equivalents of $NaOC_6H_5$ was added to an anhydrous dioxane solution of 0.24 equivalents of $N_3P_3Cl_6$ at room temperature with constant stirring. After the addition, the reaction mixture then was refluxed for 5 hours and stirred overnight at room temperature. The reaction solution was poured into an excess of water to yield a white solid. The resulting solid was washed with a large excess of water. The resulting product (97% yield) was a white, crystalline solid having a melting point of 115° C. The product was soluble in benzene, tetrahydrofuran, dimethylformamide, and heptane.

Example 2

$N_4P_4(OC_6H_5)_8$

The procedure of Example 1 was followed, except that to 0.40 equivalents of $NaOC_6H_5$ was added 0.31 equivalents of $N_4P_4Cl_8$. The resulting product (92% yield) was a white crystalline solid having a melting point of 86° C. The product was soluble in benzene, tetrahydrofuran, dimethylformamide, and heptane.

Example 3

$N_3P_3(OC_6H_4\text{-}4\text{-}Cl)_6$

The procedure of Example 1 was followed, except that to 0.077 equivalents of $NaOC_6H_4$—4—Cl was added 0.056 equivalents of $N_3P_3Cl_6$. The resulting product (98% yield) was a white crystalline solid having a melting point of 151° C. The product was soluble in benzene, tetrahydrofuran, dimethylformamide, and heptane.

Example 4

$N_4P_4(OC_6H_4\text{-}4\text{-}Cl)_8$

The procedure of Example 1 was followed, except that to 0.44 equivalents of $NaOC_6H_4$—4—Cl was added 0.34 equivalents of $N_4P_4Cl_8$. The resulting product (94% yield) was a white crystalline solid. The product was soluble in benzene, tetrahydrofuran, dimethylformamide, and heptane.

Example 5

$N_3P_3(OC_6H_5)_3(OC_6H_4\text{—}4\text{—}OCH_3)_3$

The procedure of Example 1 was followed, except that to 0.546 equivalents of $NaOC_6H_5$ and 0.546 equivalents of $NaOC_6H_4$—4—Cl was added 0.84 equivalents of $N_3P_3Cl_6$. The resulting product (89% yield) was a yellow viscous oil. The product was soluble in benzene, diethyl ether, tetrahydrofuran, dimethylformamide, and heptane.

Example 6

$N_3P_3(OC_6H_4\text{-}4\text{-}OCH_3)_3(OC_6H_4\text{-}4\text{-}secC_4H_9)_3$

The procedure of Example 1 was followed, except that to 0.546 equivalents of $NaOC_6H_4$—4—$OCH_3$ and 0.546 equivalents of $NaOC_6H_4$-4-$secC_4H_9$ was added 0.84 equivalents of $N_3P_3Cl_6$. The resulting product (82% yield) was a light brown viscous oil. The product was soluble in benzene, diethyl ether, tetrahydrofuran, dimethylformamide, and heptane.

Examples 7–18

Various polyphosphazenes were plasticized with cyclic oligomers. The plasticized polymers were prepared by dissolving the oligomer and polymer in tetrahydrofuran and casting a film from this solution. The specific polymers blended, the amounts of plasticizer, the glass transition temperature of the plasticized polymers, and the Young's Modulus of the plasticized polymers are set forth in Table I. All plasticizer concentrations are based on parts by weight per 100 parts by weight of polyphosphazene. The Tg were obtained by differential scanning calorimetry. Many of the polyphosphazenes illustrated herein are disclosed and claimed in U.S. Application Ser. No. 661,862, filed Feb. 27, 1976.

Table I

| Example | Polymer | Parts | Plasticizer | Young's Modulus (dyne/cm$^2$) | Tg (°C) |
|---|---|---|---|---|---|
| Comparative 7 | [NP(OC$_6$H$_5$)(OC$_6$H$_4$-4-OCH$_3$)]$_n$ | | — | 1.41 × 10$^9$ | −0.97 |
| 8 | " | 10 | N$_3$P$_3$(OC$_6$H$_5$)$_3$(OC$_6$H$_4$-4-OCH$_3$)$_3$ | 5.21 × 10$^8$ | −1.50 |
| | " | 30 | " | 1.40 × 10$^8$ | −2.00 |
| 9 | " | 50 | " | 8.00 × 10$^7$ | −2.50 |

Table I-continued

| Example | Polymer | Parts | Plasticizer | Young's Modulus (dyne/cm$^2$) | Tg (°C) |
|---|---|---|---|---|---|
| 10 | " | 10 | $N_3P_3(OC_6H_4$-4-$OCH_3)_3(OC_6H_4$-4-$secC_4H_9)_3$ | $5.20 \times 10^8$ | −8.10 |
| 11 | " | 30 | " | $5.70 \times 10^7$ | −11.30 |
| 12 | " | 50 | " | $3.70 \times 10^7$ | −14.80 |
| Comparative 7 | [NP(OC$_6$H$_4$-4-OCH$_3$)(OC$_6$H$_4$-4-isoC$_3$H$_7$)]$_n$ | — | — | $1.97 \times 10^9$ | +4.20 |
| 14 | " | 10 | $N_3P_3(isoOC_3H_7)_6$ | $1.69 \times 10^9$ | −3.60 |
| 15 | " | 30 | " | $6.47 \times 10^8$ | −24.0 |
| Comparative 16 | [NP(OC$_6$H$_4$-4-OCH$_3$)$_{1.33}$(OC$_6$H$_4$-4-isoC$_3$H$_7$)$_{0.67}$]$_n$ | 50 | " | $3.31 \times 10^8$ | −31.0 |
| 17 | " | 10 | — | $4.10 \times 10^9$ | +4.0 |
| 18 | " | 10 | $N_3P_3(OC_6H_5)_6$ | $1.18 \times 10^9$ | −5.4 |
|  | " | 50 | $N_4P_4(OC_6H_5)_8$ | $2.05 \times 10^9$ | −0.72 |
|  |  |  |  | $1.17 \times 10^9$ | −5.2 |

The following Masterbatch formulation was employed in the preparation of plasticized polyphosphazene foams using a peroxide-curing system:

| Peroxide-Cure Masterbatch | Parts by Weight |
|---|---|
| Cup A  Polyphosphazene | 100 |
| Cup B* 1,1'-azobisformamide | 20 |
| oil-treated urea (activator) | 5 |
| magnesium oxide | 5 |
| zinc stearate | 10 |
| cumarone indene resin (Cumar P-10) | 2 |
| 2,5-dimethyl-2,5-di-t-butyl peroxyhexane | 6 |
| benzoyl peroxide (78% active) | 2 |
| dicumyl peroxide | 1 |
| alumina trihydrate | 100 |
| Plasticizer | Varied |

*Parts per 100 parts of polyphosphazene

Polymers were blended on a two-roll mill with one roll at 120°–140° F. and the other at ambient conditions. Polymer in Cup A was blended for 15 minutes to ensure homogeneous mixing. The ingredients in Cup B were added to the polymer on the mill. This was allowed to mix for an additional 15 minutes. The unexpanded blend was then precured in a press for one minute at a temperature of 220° F. and a pressure of 2000 psi. Pad thickness after pressing was ⅛ inch. Finally, the precured pad was free expanded in a circulating air oven for 30 minutes at 300° F.

Comparative

Using the formulation and method described above where 100 parts of [NP(OC$_6$H$_5$)(OC$_6$H$_4$—4—OCH$_3$)]$_n$ was used and no plasticizer, the ingredients were blended and foamed. The resulting foam was a stiff, dark brown, poorly expanded pad, density 50.8 pounds per cubic foot.

Table II

| Ex./Polymer[1] | phr Plasticizer | Foam Density (lbs/ft$^3$) | Relative Vol. Expansion[2] | Relative Flexibility | Remarks |
|---|---|---|---|---|---|
| Comparative [NP(OC$_6$H$_5$)(OC$_6$H$_4$-4-OCH$_3$)]$_n$ | — | 50.8 | 1.0 | 1 | Stiff, poorly expanded |
| 19  " | 30 [NP(OC$_6$H$_5$)(OC$_6$H$_4$-4-OCH$_3$)]$_3$ | 52.2 | 1.4 | 3 | Soft, flexible |
| 20  " | 10 [NP(OC$_6$H$_4$-4-secC$_4$H$_9$)(OC$_6$H$_4$-4-OCH$_3$)]$_3$ | 43.3 | 1.6 | 1–2 | Slightly expanded |
| 21  " | 30  " | 33.1 | 2.2 | 2 | Soft, expanded |
| 22  " | 50  " | 37.5 | 2.1 | 3 | Flexible, expanded |
| 23  " | 100  " | 32.4 | 2.6 | 4 | Leathery, slightly expanded |
| 24  " | 50 [NP(OC$_6$H$_5$)$_2$]$_3$ | 18.0 | 4.4 | 2 | Well expanded, uniform cells |
| 25  " | 40 [NP(OC$_6$H$_5$)$_2$]$_4$ | 17.2 | 4.4 | 5 | " |
| 26 [NP(OC$_6$H$_5$)(OC$_6$H$_4$-4-isoC$_3$H$_7$)]$_n$ | 50 [NP(OC$_6$H$_4$-4-Cl)$_2$]$_3$ | 16.5 | 4.9 | 2 | " |
| 27  " | 50 [NP(OC$_6$H$_4$-4-Cl)$_2$]$_4$ | 42.1 | 1.9 | 2 | Poor tensile; slightly expanded |
| 28  " | 10 [NP(OC$_6$H$_5$)(OC$_6$H$_4$-4-OCH$_3$)]$_3$ | 16.3 | 4.2 | 5 | Soft, expanded |
| 29  " | 30  " | 49.3 | 1.5 | 4 | Soft, resilient |
| 30  " | 50  " | 56.9 | 1.4 | 5 | " |
| 31  " | 100  " | 55.0 | 1.7 | 5 | " |
| 32  " | 30 [NP(OC$_6$H$_4$-4-secC$_4$H$_9$)(OC$_6$H$_4$-4-OCH$_3$)]$_3$ | 53.0 | 1.3 | 4 | Semi-resilient, uniform cells |
| 33 NP(OC$_6$H$_4$-4-OCH)(OC$_6$H$_4$-4-secC$_4$H$_9$)]$_n$ | 10 [NP(O-secC$_3$H$_7$)]$_3$ | 14.1 | 3.5 | 4–5 | soft, resilient |

[1]The polyphosphazenes illustrated in Examples 19–25 and 33 are disclosed in U. S. Application Serial No. 661,862, filed February 27, 1976. All others are disclosed in U. S. 3,856,712.
[2]Relative Volume Expansion was determined by the following: volume of plasticized polymer/volume unplasticized polymer.
[3]Relative flexibility on a scale of 1 (rigid) to 5 (very flexible)

The following Masterbatch formulation and method were employed in Examples 33 and 34 for the preparation of plasticized polyphosphzene foams using a sulfur-type curing system:

| Sulfur-Cure Masterbatch | Parts by Weight |
|---|---|
| Cup A  Polyphosphazene | 100 |
| Cup B* alumina trihydrate | 125 |

-continued

| Sulfur-Cure Masterbatch | |
|---|---|
| | Parts by Weight |
| 1,1'-azobisformamide | 20 |
| oil treated urea | 5 |
| zinc stearate | 10 |
| magnesium oxide dispersion | 5 |
| sulfur | 2 |
| zinc dimethyldithiocarbamate | 1.5 |
| N,N'-dibutylthiourea | 0.4 |
| tellurium diethyldithiocarbamate | 0.4 |
| Plasticizer | Varied |

*Parts per 100 parts of polyphosphazene

Polymers were blended on a two-roll research mill with one roll at 120°–140° F. and the other at ambient conditions. Cup A was milled for 15 minutes to allow easier processing. The ingredients in Cup B were added to the polymer on the research mill. This was allowed to mix for an additional 15 minutes. The unexpanded blend was then precured in a press for 1 minute at a temperature of 220° F. and a pressure of 2000 psi. Pad thickness after pressing was 1/8 inch. The pad was then cured at 180° F. for 120 minutes. Finally, it was freely expanded in a circulating air oven for 20 minutes at 250° F. and 20 minutes at 325° F.

The following examples illustrate the use of a liquid cyclotriphosphazene plasticizer with polyphosphazenes containing unsaturation (e.g., the group W) in foams prepared using the recipe shown above. The polyphosphazenes and plasticizers used are listed in Table III Table III

| Example | Polymer | Plasticizer | PHR | Foam Density | Relative Volume Expansion | Relative Flexibility |
|---|---|---|---|---|---|---|
| Comparative | [NP(OC$_6$H$_4$)$_{0.64}$(OC$_6$H$_4$-4-OCH$_3$)$_{0.64}$(OC$_6$H$_3$-2-OCH$_3$-4-CH$_2$CH=CH$_2$)$_{0.08}$]$_n$ | [NP(OC$_6$H$_4$-4-secC$_4$H$_9$)(OC$_6$H$_4$-4-OCH$_3$)']$_3$ | 0 | 9.2 | 1.0 | 1.2 |
| 34 | " | " | 50 | 6.2 | 1.75 | 5 |
| 35 | [NP(OC$_6$H$_4$-4-OCH$_3$)$_{0.97}$(OC$_6$H$_4$-4-C$_2$H$_5$)$_{0.97}$(OC$_6$H$_3$-2-OCH$_3$-4-CH$_2$CH=CH$_2$)$_{0.06}$]$_n$ | " | 50 | 22.9 | 4.0 | 5 |
| Comparative | " | — | 0 | 6.2 | 1.0 | 2 |

What is claimed is:

1. A process for foaming a plasticized fire-retardant, low-smoking composition comprising
   (a) a phosphazene homopolymer or copolymer comprising repeating units of the formula

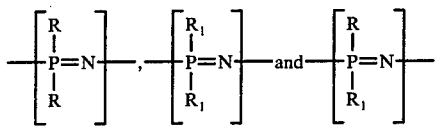

where R and R$_1$ are the same or different and are halogen, amino, C$_1$ to C$_{10}$ dialkylamino, C$_1$ to C$_{10}$ alkylamino, C$_6$ to C$_{14}$ arylamino, C$_6$ to C$_{14}$ diarylamino, C$_1$ to C$_{18}$ linear or branched alkyl, C$_2$ to C$_{18}$ linear or branched alkenyl, C$_1$ to C$_{18}$ alkoxy, C$_6$ to C$_{14}$ aryl, C$_6$ to C$_{14}$ aryloxy, substituted C$_1$ to C$_{18}$ linear or branched alkyl, substituted C$_2$ to C$_{18}$ linear or branched alkenyl, substituted C$_1$ to C$_{18}$ alkoxy, substituted C$_6$ to C$_{14}$ aryl, or substituted C$_6$ to C$_{14}$ aryloxy, the substituents selected from the group consisting of chlorine, bromine, nitro, cyano, alkoxy, aryloxy, alkenyl, amino, C$_1$ to C$_{10}$ alkylamino, C$_1$ to C$_{10}$ dialkylamino, C$_6$ to C$_{14}$ arylamino, C$_6$ to C$_{14}$ diarylamino, or mixtures thereof; and
   (b) from about 0.1 to about 100 parts by weight per 100 parts of said phosphazene homopolymer or copolymer of a compatible cyclophosphazene of the formula $$(NPR_{2x-y}R_1^y)_x$$

where R and R$_1$ are the same as above, x is at least 3, and y ≤ 2x;

which process comprises mixing the composition with a chemical blowing agent and heating the mixture to a temperature sufficient to decompose said blowing agent.

2. The process of claim 1 wherein said blowing agent is 1,1'-bisazoformamide.

3. The process for foaming the composition of claim 1 wherein said phosphazene homopolymer or copolymer comprises randomly distributed repeating units represented by the formulas

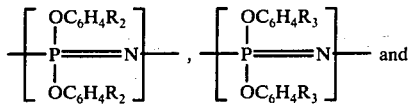

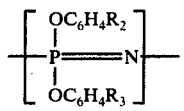

where R$_2$ and R$_3$ are the same or different and are hydrogen, C$_1$ to C$_{10}$ linear or branched alkyl, C$_1$ to C$_{10}$ linear or branched alkoxy, substituted on any sterically permissible position on the phenoxy group which comprises mixing the composition with a chemical blowing agent and heating the mixture to a temperature sufficient to decompose said blowing agent.

4. The process of claim 3 wherein the polyphosphazene has randomly distributed repeating units of the formula

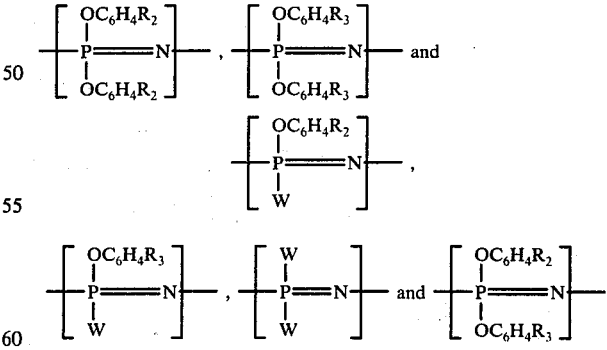

wherein W is a substituent capable of a crosslinking chemical reaction which comprises mixing the composition with a chemical blowing agent and heating the mixture to a temperature sufficient to decompose said blowing agent.

5. A foam produced according to the process of claim 1.